(12) United States Patent
Morgan

(10) Patent No.: US 9,923,220 B2
(45) Date of Patent: Mar. 20, 2018

(54) ELECTRICITY GENERATION

(75) Inventor: Russell Alan Morgan, Waterlooville (GB)

(73) Assignee: BAE SYSTEMS plc, London (GB)

(*) Notice: Subject to any disclaimer, the term of this patent is extended or adjusted under 35 U.S.C. 154(b) by 550 days.

(21) Appl. No.: 14/124,872

(22) PCT Filed: Jun. 8, 2012

(86) PCT No.: PCT/GB2012/051287
§ 371 (c)(1),
(2), (4) Date: Dec. 9, 2013

(87) PCT Pub. No.: WO2012/168718
PCT Pub. Date: Dec. 13, 2012

(65) Prior Publication Data
US 2014/0116490 A1    May 1, 2014

(30) Foreign Application Priority Data

Jun. 8, 2011  (EP) .................................... 11275093
Jun. 8, 2011  (GB) .................................... 1109576.7

(51) Int. Cl.
*H01M 8/0606*  (2016.01)
*G21H 1/00*  (2006.01)
(Continued)

(52) U.S. Cl.
CPC .......... *H01M 8/0606* (2013.01); *C01B 3/042* (2013.01); *C01B 3/501* (2013.01);
(Continued)

(58) Field of Classification Search
CPC .................................................. H01M 8/0606
See application file for complete search history.

(56) References Cited

U.S. PATENT DOCUMENTS 3,189,765 A    6/1965  Danko et al.
3,754,147 A    8/1973  Hancock et al.
(Continued)

FOREIGN PATENT DOCUMENTS

EP              0560742 A1    9/1993
WO      WO 2004/105049 A1    12/2004
(Continued)

OTHER PUBLICATIONS

Preals et al., "Diamond Photovoltaics in Energy COnversion", Aug. 1999, 2nd International Conference on the Applications of Diamond Films and Related Materials, vol. 2, pp. 329-333.*
Green et. al, "Radcalc: A Computer Program to Calculate the Radiolytic Production of Hydrogen Gas From Radioactive Wastes in Packages", Nov. 1995.*
(Continued)

*Primary Examiner* — Maria Laios
*Assistant Examiner* — Nathanael T Zemui
(74) *Attorney, Agent, or Firm* — Finch & Maloney PLLC

(57) ABSTRACT

An electricity generation apparatus is disclosed. An exemplary apparatus includes a plasma container for containing a plasma sustained by radioactive decay. The plasma container has an inlet through which, in use of the apparatus, water can be introduced to the plasma container, and an outlet through which, in use of the apparatus, material can be expelled from the container. The exhausted material can include hydrogen and oxygen resulting from the dissociation of water molecules caused by interactions within the plasma. A separator can separate hydrogen from the material exhausted from the plasma container, which separator is coupled to the outlet, and a generator can generate electricity using the hydrogen as a fuel.

20 Claims, 2 Drawing Sheets

Figure 1:
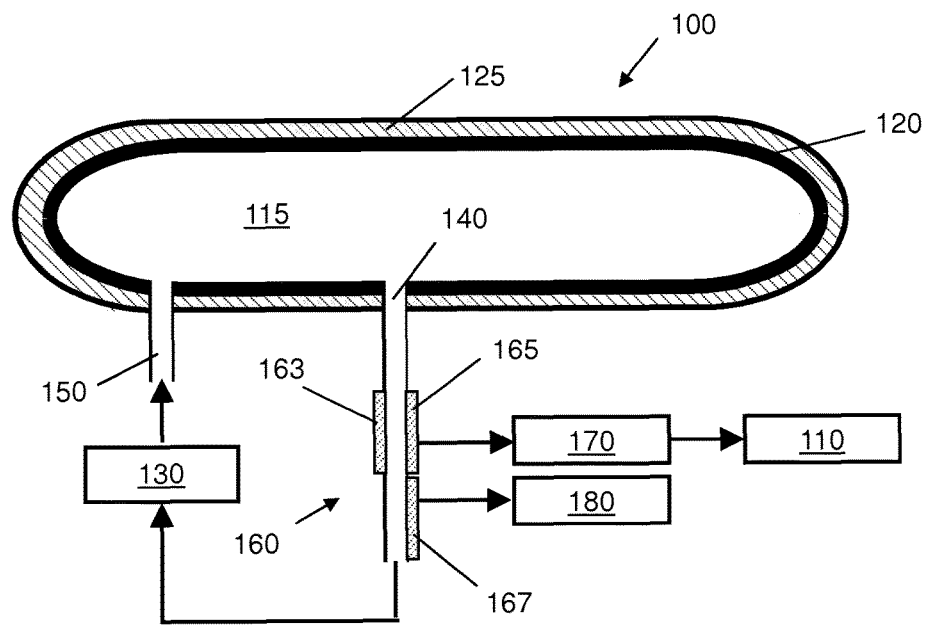

(51) Int. Cl.
*G21H 1/10* (2006.01)
*C01B 3/04* (2006.01)
*C01B 3/50* (2006.01)
*C01B 13/02* (2006.01)

(52) U.S. Cl.
CPC ...... *C01B 13/0207* (2013.01); *C01B 13/0229* (2013.01); *G21H 1/00* (2013.01); *G21H 1/10* (2013.01); *C01B 2203/0405* (2013.01); *C01B 2203/0465* (2013.01); *C01B 2210/0053* (2013.01); *Y02E 60/364* (2013.01)

(56) References Cited

U.S. PATENT DOCUMENTS

| | | | |
|---|---|---|---|
| 4,124,802 | A | 11/1978 | Terasawa et al. |
| 5,352,954 | A | 10/1994 | Cirri |
| 5,650,051 | A | 7/1997 | Wada et al. |
| 2004/0265137 | A1* | 12/2004 | Bar-Gadda ............ B01J 19/126 417/53 |
| 2005/0029120 | A1* | 2/2005 | Bar-Gadda ............ C01B 3/042 205/628 |
| 2006/0022127 | A1 | 2/2006 | Zyuzin |
| 2009/0071526 | A1* | 3/2009 | Parker ................... F24J 1/00 136/205 |

FOREIGN PATENT DOCUMENTS

| WO | WO 2010/053387 A1 | 5/2010 | |
|---|---|---|---|
| WO | WO 2011140322 A1 * | 11/2011 | ............ H01M 8/20 |

OTHER PUBLICATIONS

Notification Concerning Transmittal of International Preliminary Report on Patentability (Forms PCT/IB/338 and PCT/IB/373) and the Written Opinion of the International Searching Authority (Form PCT/ISA/237) dated Dec. 27, 2013, by the International Bureau of of WIPO in corresponding International Application No. PCT/GB2012/051287 (10 pages).

International Search Report (PCT/ISA/210) dated Oct. 9, 2012, by the European Patent Office as the International Searching Authority for International Application No. PCT/GB2012/051287.

European Search Report dated Oct. 25, 2011 for European Application No. 11275093.0.

Great Britain Search Report dated Oct. 3, 2011 for Great Britain Application No. GB1109576.7.

J. O'M. Bockris et al., On the Splitting of Water, Int. J. Hydrogen Energy, vol. 10, No. 30, Jan. 1, 1985, pp. 179-201.

Prelas, M.A., et al., "Diamond Photovoltaics In Energy Conversion," 2nd International Conference on the Applications of Diamond Films and Related Materials, Tokyo, 1993, pp. 329-334.

Phair, J.W., and Badwal, S.P.S., "Materials for separation membranes in hydrogen and oxygen production and future power generation," Elsevier—ScienceDirect, Science and Technology of Advanced Materials vol. 7, 2006, pp. 792-805.

Schwabedissen, A., et al., "Langmuir probe measurements in an inductively coupled plasma source," Physical Review E, vol. 55, No. 3, Mar. 1997, pp. 3450-3459.

Schwabedissen, A., et al., "Comparison of electron density measurements in a planar inductively coupled plasmas by means of the plasma oscillation method and Langmuir probes," Plasma Sources Sci. Technol. vol. 7, 1998, pp. 119-129. downloaded from IOPscience.iop.org on Dec. 16, 2013 at 13:20.

* cited by examiner

ELECTRICITY GENERATION

The present invention relates to apparatus and methods for electricity generation, and more particularly to apparatuses and methods based on the conversion of energy released through radioactive decay into useable electric power, either directly or via an energy storage process.

The conversion of energy released through radioactive decay into electrical energy is known, for example, from the paper 'Diamond Photovoltaics in Energy Conversion', by M. A. Prelas et al., published in the proceedings of the 2$^{nd}$ International Conference on the Applications of Diamond Films and Related Materials, edited by M. Yoshikawa, M. Murakawa, Y. Tzeng and W. A. Yarbrough, 1993, page 329. Prelas et al. disclose a means for generating power using the radioisotope krypton-85. Krypton-85 decays via the emission of beta particles, which can in turn ionise other krypton-85 atoms, or excite the electrons in other krypton-85 atoms. The process of beta emission can therefore be used to sustain a plasma in a contained volume of krypton-85. Recombination of electrons with ions in the plasma, or relaxation of excited atoms, results in the emission of photons. Prelas et al. suggest the capture of these photons at photovoltaic cells surrounding the plasma container, in order to generate electric power.

A problem with the means for generating electrical power disclosed by Prelas et al. is the relative inefficiency of photovoltaic devices, particularly at the high temperatures generated in the plasma. Prelas et al. suggest the use of wide-bandgap semiconductors in order to improve the efficiency of such a device, but the overall efficiency of electrical power generation is still limited to around 40%.

It is therefore desirable to increase the efficiency of electrical power generation based on radioactive decay. It is further desirable to provide alternate means of electrical power generation based on radioactive decay.

In accordance with a first aspect of the invention, there is provided electricity generation apparatus comprising a plasma container for containing a plasma sustained by radioactive decay; the plasma container having an inlet through which, in use of the apparatus, water can be introduced to the plasma container, and an outlet through which, in use of the apparatus, material comprising hydrogen and oxygen resulting from the dissociation of water molecules can be exhausted from the container; the apparatus further comprising a separator for separating hydrogen from the material exhausted from the plasma container, the separator being coupled to the outlet, and a generator operable to generate electricity using the hydrogen as a fuel.

The plasma container may contain a radioactive gas. Preferably, the radioactive gas comprises a radioisotope susceptible to decay by beta decay, such as, for example, krypton 85. The radioactive gas may also comprise a radioisotope susceptible to decay by positron emission.

The generator may comprise a fuel cell.

The pressure in the plasma container may be in the range between 1 atmosphere and 30 atmospheres, preferably in the range between 5 atmospheres and 20 atmospheres, and, in one exemplary embodiment, is approximately 10 atmospheres. The pressure in the plasma container may be selected such that the concentration of electrons within the plasma is generally at a maximum.

The apparatus may further comprise a mixture management system operable to control the pressure in the plasma container, and to control the relative amounts of water vapour and radioactive gas in the plasma container.

There may be provided a hydrogen storage device to store hydrogen expelled from the plasma container and operable to deliver hydrogen to the generator at a rate dependent on electric power demand.

The separator may comprise a selective transport membrane. The selective transport membrane may comprise a hydrogen selective membrane. In one embodiment, the separator comprises a hydrogen selective membrane and an oxygen selective membrane.

The apparatus may further comprise a thermoelectric power generator comprising a thermoelectric material having a first portion in thermal contact with a surface of the plasma container and a second portion in thermal contact with a heat sink. In one preferred embodiment, the thermoelectric material comprises lead telluride.

In accordance with a second aspect of the invention, there is provided apparatus for the generation of electrical power comprising: means to dissociate water molecules to form hydrogen and oxygen; means to separate and store hydrogen; and means to generate electricity using the stored hydrogen as a fuel; the means to dissociate water comprising a plasma sustained by radioactive decay.

In accordance with a third aspect of the invention, there is provided a method of generating electric power, comprising passing water through a plasma, the plasma being arranged such that water molecules are dissociated into hydrogen and oxygen; separating the hydrogen, supplying the hydrogen to a fuel cell, and operating the fuel cell to generate electric power.

Figure 2:
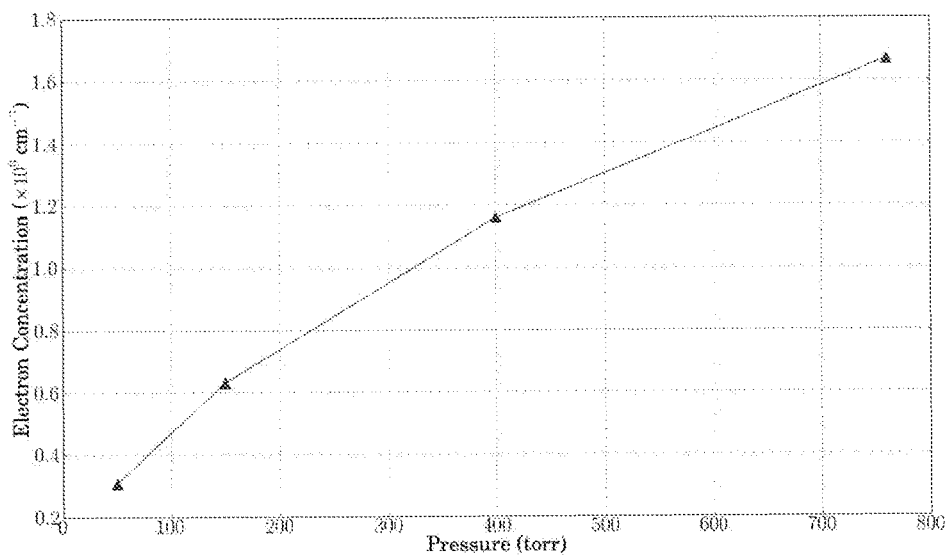
Figure 3:
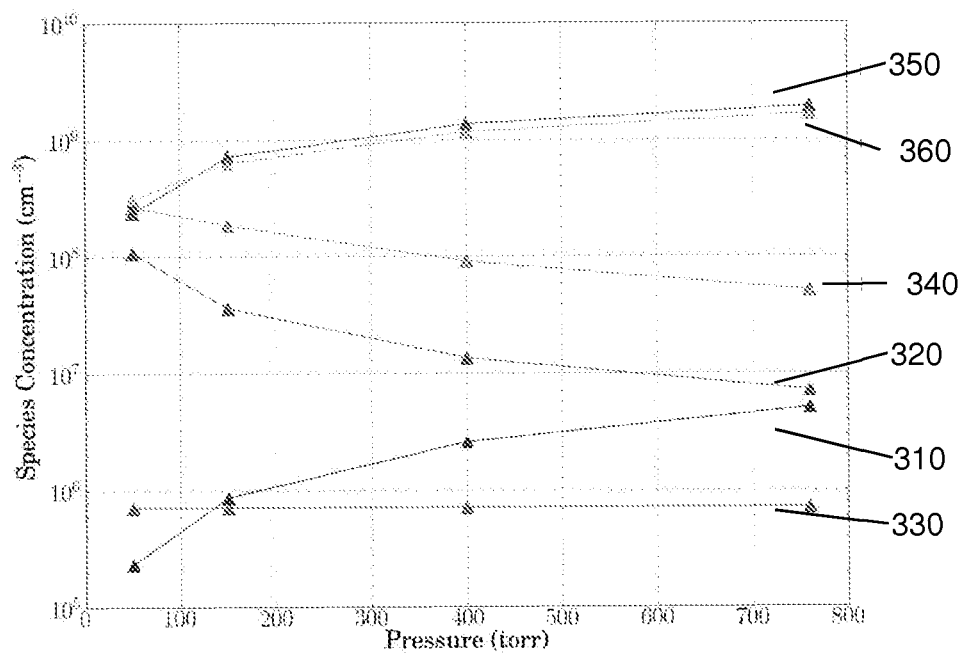
Figure 4:
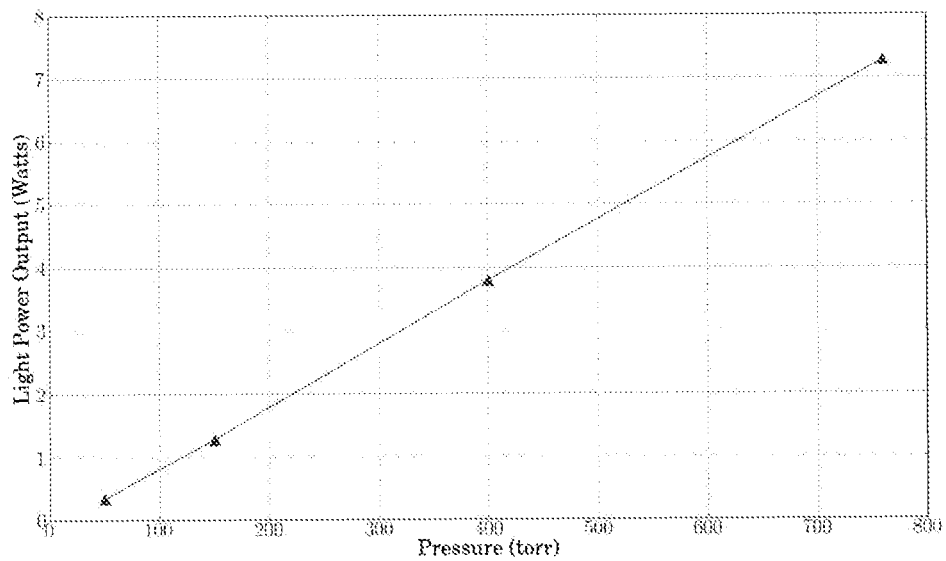

An embodiment of the invention will now be described with reference to the accompanying drawing in which:

FIG. 1 is a schematic diagram of apparatus in accordance with a first embodiment of the invention; and FIGS. 2 to 4 are graphical illustrations of the properties of a plasma used in the apparatus illustrated in FIG. 1, as calculated by simulation.

FIG. 1 is a schematic diagram of apparatus 100 for the generation of electrical power in accordance with a first embodiment of the invention. In broad terms, electrical power is generated by a fuel cell 110 that runs on hydrogen fuel generated within the apparatus 100 by the dissociation of water. Water dissociation is achieved by the injection of pure water into a plasma 115 which is sustained by radioactive decay. Interactions between radicals in the plasma and water molecules cause dissociation of the water. Selection of a radioisotope having a suitably long half life enables electrical power to be generated over a long period of time with the only necessary fuel input being water.

In the present embodiment, the plasma is sustained by beta decay of the radio isotope krypton-85, which has a half life of approximately 10.5 years and decays by beta emission to the stable rubidium-85. Decay of $^{85}$Kr occurs predominantly (99.5%) by beta emission at 687 keV, there being also a minor decay channel (0.5%) in which beta emission at 173 keV is accompanied by gamma emission at 514 keV. These energetic particles may collide inelastically with other $^{85}$Kr atoms, resulting in ionisation and the generation of further energetic electrons, which may themselves have sufficient energy to cause further ionisation. These processes lead to the formation of a plasma.

A number of interactions between the various species within the plasma are possible, including ionisation as described above; excitation of krypton atoms by collision with electrons in the plasma, with subsequent relaxation accompanied by photon emission; Pen ionisation, in which a krypton atom in an excited state collides with an unexcited krypton atom, resulting in ionisation of one of the krypton atoms; recombination of electrons with krypton ions resulting in the formation of a krypton atom and photon emission; electronegative capture resulting in the formation of negatively charged krypton ions; and ion-ion recombination, involving the collision of a oppositely charged krypton ions resulting in two krypton atoms and accompanying photon emission. Other interactions can result in the formation of ionised krypton molecules, and doubly charged krypton ions.

These processes result in the plasma exhibiting a high photon density, and in the presence of a high-temperature electron population. Water added to this plasma may be dissociated either by collision with an electron, or by interaction with a photon of suitably high energy, creating both hydrogen and oxygen. Hydrogen can be separated for subsequent use as a fuel to generate electrical power as described below.

A summary of some of the processes taking place in the plasma is presented in table 1 below.

TABLE 1

Summary of interactions in $^{85}$Kr beta-emission sustained plasma

| Ionisation | $e + Kr \rightarrow Kr^+ + 2e$ | $B^- + Kr^+ \rightarrow Kr + nh\nu$ |
|---|---|---|
| Excitation | $e + Kr \rightarrow Kr^* + e$ | Relaxation $Kr^* \rightarrow Kr_g + h\nu$ |
| Pen ionisation | $Kr^* + Kr \rightarrow Kr^+ + Kr + e$ | via meta stable formation |
| Recombination | $E + Kr^+ \rightarrow Kr + e + h\nu$ | via third body |
| Electron attachment | $E + Kr \rightarrow Kr^-$ | Electronegative capture |
| Ion-ion recombination | $Kr^+ + Kr- \rightarrow 2Kr + nh\nu$ | via third body |
| Beta recombination | $B^- + Kr^+ \rightarrow Kr + nh\nu$ | high photon and some gamma |
| Stable $^{85}$Rb formation | $^{85}Kr^{49}_{36} \rightarrow + ^{85}Rb^{48}_{37} + B^-$ | B− 99.5% at 687 KeV |
| Water dissociation (electron impact) | $e^- + H_2O \rightarrow 2H + O$ | OH$^-$ radicals formed in intermediary steps |
| Water dissociation (UV) | $H\nu + H_2O \rightarrow 2H + O$ | OH$^-$ radicals formed in intermediary steps |

Simulations of such a plasma, in which the beta decay of krypton 85 is modelled as a source of high energy electrons within the plasma, have been made. The rate of decay of the krypton 85, and the average energy of electrons emitted in such a decay, are used to define the relevant properties of the source. The simulations were performed by Quantemol, using proprietary software Quantemol-P. The validity of the simulation results was confirmed by comparison to experimental results published by Schwabedissen et al., in Physical Review E, volume 55, pages 3450 to 3459 (1997), and by Schawbedissen et al. in Plasma Sources Science and Technology, volume 7, pages 119 to 129 (1998). Schwabedissen et al. report measurements of plasma potential, electron density, effective electron temperature, and electron energy distribution function in planar, electrostatically shielded, low pressure inductively coupled plasmas. The results by simulation at low temperature of the plasma sustained by a high energy electron source (rather than an inductively coupled plasma) were found to show good shape agreement with the results obtained by Schwabedissen et al. Magnitude discrepancies are thought to be due to the fact that the simulation calculates a global average, whilst the experiments obtained a point measurement.

The simulations provide an estimation of the light output from the decay of one dominant excited state Kr* post-decay, of the electron and gas temperatures, and of the densities of the various species within the plasma, at pressures of 50, 150, 400, and 760 torr. FIGS. 2, 3, and 4 illustrate the results obtained by the simulation.

FIG. 2 illustrates the variation of the electron concentration in the plasma with pressure of krypton 85. It can be seen that the electron concentration increases with increasing pressure over the entire range of pressures tested within the simulation, with an electron concentration of $1.67 \times 10^9$ cm$^{-3}$ at a pressure of 760 torr. Notably, the dependence does not appear to be linear, which suggests that there may be an optimal pressure at which the electron concentration is at a maximum. It is believed that this pressure will be in the range between 5 and 20 atmospheres, for example at approximately 10 atmospheres. In the present embodiment, the pressure in the plasma container is set at 10 atmospheres.

FIG. 3 illustrates the variation of the concentration of various species within the plasma with pressure of krypton-85. The concentration of Kr*, an excited state of krypton, is indicated by line 310. The concentration of singly-ionised krypton Kr$^+$ is indicated by line 320. The concentration of doubly krypton Kr$^{2+}$ is indicated by line 330. The concentration of Kr$_2^+$ is indicated by line 340, and the concentration of Kr$_3^+$ is indicated by line 350. Finally, the concentration of electrons is indicated by line 360. The concentration of krypton 85 atoms over this range of pressures is omitted for clarity, but for comparison purposes it is noted that this concentration varies from $1.6 \times 10^{18}$ cm$^{-3}$ to $2.4 \times 10^{19}$ cm$^{-3}$ over this range of pressures. FIG. 4 illustrates the variation in light output over this pressure range. As with electron concentration, the light output increases with pressure over the simulated pressure range, from 0.34 W at 50 torr to 7.27 W at 760 torr.

The plasma is contained within a plasma container, which in the present embodiment comprises a stainless steel pressure vessel 120. 316L stainless steel is used to fabricate the plasma container as it has a relatively low carbon content. It is preferable to select a low carbon content stainless steel since carbon can be attacked by radical species within the plasma, particularly those species generated by the dissociation of water molecules. The plasma container is coupled to a mixture management system 130, and in that an outlet 140 is provided to allow evolved gases to be expelled from the system such that hydrogen can be separated for use as fuel as described below. The mixture management system controls the pressure within the vessel 120, and introduces water vapour into the vessel 120 via inlet 150. The control provided by the mixture management system 130 maintains the conditions in the plasma container appropriately for the plasma to be sustained, in particular maintaining the pressure within the container, but also maintaining a sufficient ratio of $^{85}$Kr to water vapour (through varying the rate of introduction of water vapour) to provide a suitable ionisation rate.

The pressure within the plasma is most preferably selected to result in a peak electron concentration. At higher electron concentration, more radicals are generated, which will result in a higher rate of dissociation of water molecules in the plasma container. In addition, at higher electron concentrations, the electron population is better thermalized, resulting in a even distribution of energy amongst the electron population, and in more thermal energy being transferred to the plasma as a whole. The simulation work described above demonstrates that peak electron concentration is not achieved at pressures below 760 torr (i.e. below atmospheric pressure). In the present embodiment, a pressure of 10 atm is selected for the plasma. At such a pressure, it is anticipated that the plasma temperature will reach approximately 250° C. to 300° C. Thermoelectric power generation techniques, such as are described in further detail below, can be used to extract additional power from the plasma container as a result of the high temperatures generated. In contrast to the disclosure of Prelas et al., photovoltaic power generation is not used in the present embodiment, because typical materials used for photovoltaic power generation are not efficient at these temperatures.

It may further be surrounded by a lead radiation shield, although in the present embodiment the entire apparatus is surrounded by a radiation shield in order to mitigate the effects of contamination of the gases expelled from the plasma container with radioactive material. The interior surface of the container is polished to suppress recombination rates.

The plasma container outlet 140 is coupled to a separator indicated generally by reference numeral 160. Separator 160 separates the exhaust gases that pass through outlet 140. These exhaust gases will include oxygen, hydrogen, water, krypton and rubidium compounds (including rubidium oxide) resulting from the radioactive decay of krypton-85. In the present embodiment, separator 160 comprises a number of different stages each adapted to separate out a particular component of the exhaust gases. A cold finger, indicated schematically at 163, can be used to condense rubidium compounds formed by the radioactive decay of $^{85}$Kr from the exhaust gases. Subsequently, hydrogen and oxygen are removed from the exhaust gases using suitable membrane technology, and the remaining exhaust gases can be recirculated into the plasma container via the management system 130.

A hydrogen selective membrane 165 is used to separate out hydrogen from the exhaust gases. Hydrogen separation membranes selectively pass hydrogen from a region in which there is a relatively high partial hydrogen pressure to a region in which there is a relatively low partial hydrogen pressure. Hydrogen selectivity occurs as a result of the small size of the hydrogen molecules, or can result from the catalytic dissociation of hydrogen on a membrane surface followed by proton transport through the membrane, and subsequent recombination to hydrogen molecules. Several materials can be used including dense metals, nano-porous inorganic materials such as ceramics, ceramics, oxides or glasses, organic polymers, dense ion transport membranes based on proton conducting materials, or composites of such materials. J. W. Phair and S. P. S. Badwal review these technologies in their paper 'Materials for separation membranes in hydrogen and oxygen production and future power generation', published in Science and Technology of Advanced Materials, Volume 7 (2006) at pages 792-805, the content of which is hereby incorporated by reference. In the present embodiment, it is preferred to use membranes that do not require significant heating or other power in order to transport hydrogen, so that the efficiency of power generation is not compromised by parasitic power demands arising from gas separation. In the present embodiment, hydrogen selective membrane 165 is based on sulfonated polyether ketone, which functions at temperatures below 80° C., is used, although it should be appreciated that many other materials may also provide suitable separation.

Oxygen separation is performed by oxygen ion transport membrane 167, which selectively transports oxygen through a mechanism similar to that described above with reference to hydrogen separation membrane 165. It is preferable to select a membrane composition that does not require significant heating or other power in order to achieve oxygen transport, as in the case of the hydrogen separation membrane, in order to reduce parasitic power demands on the power conversion apparatus and thereby enhance efficiency. Oxygen ion transport membrane technology is also reviewed in the above-referenced paper by Phair et al. In the present embodiment, membrane 167 comprises a dual phase mixture of doped zirconia (conductive to oxygen ions) and silver metal (to conduct electrons), although it will be appreciated that other membrane technologies can be used. Oxygen passing through the membrane is dumped to dump 180. In the present embodiment, dump 180 leads directly to the external environment, but those skilled in the art will appreciate that either direct to the external environment, or into a suitable store. Those skilled in the art will appreciate that heat for the oxygen ion transport membrane can be provided from heat generated by the interactions within the plasma container by ensuring suitable thermal coupling between the ion transport membrane and the plasma container.

The output from the hydrogen selective membrane 165 is coupled to a safe delivery system 170 and then subsequently to fuel cell 110 which generates electricity using the hydrogen as fuel. Safe delivery systems are commercially available, for example from PraxAir. The safe delivery system 170 170 is arranged to ensure a low partial pressure of hydrogen on the storage side of hydrogen selective membrane 165 in order to enhance the efficiency of transport across the membrane, and to deliver hydrogen to a fuel cell that generates electricity from electrochemical reactions between the hydrogen and oxygen supplied, for example from the air, to the fuel cell. Fuel cells are also commercially available, for example from Rolls-Royce. Currently available fuel cells function at efficiencies of order 65% in the conversion of the chemical potential energy of hydrogen into electrical power. It will be appreciated that in alternative embodiments, oxygen for the fuel cell could be provided from selective membrane 167.

Additional power generation is provided by thermoelectric means. Thermoelectric materials develop an electric potential difference when subjected to a temperature gradient. The heat generated by the plasma can be used, in combination with an appropriate heat sink, to provide a thermal gradient across a thermoelectric material, which can then be used to generate additional electric power that can be stored in an appropriate battery or provided for immediate usage. With the plasma developing a temperature of approximately 250° C. to 300° C. (approximately 620 K to 670 K), a heat sink can be provided by exposure to the external environment. Strong thermal gradients may be created where the apparatus is used in submarine applications, or when the apparatus is used to provide power to satellites or other space vehicles.

In order to increase the amount of power that can be generated by the thermoelectric effect, it is desirable to increase the ratio of surface area to volume of the plasma container, so that the available surface area with which thermoelectric materials can be placed in contact is increased.

Many suitable thermoelectric materials can be used, including, in preferred embodiments, semiconductor structures based on bismuth telluride or lead telluride p-n junctions. In the present embodiment, where the plasma container is expected to reach a temperature in the range between 250° C. and 300° C., lead telluride is believed to provide more efficient thermoelectric power generation than bismuth telluride, although the thermoelectric effect in lead telluride may be more pronounced at slightly higher temperatures. Lead telluride material is therefore applied around the outer surface of the plasma container 120, as indicated generally in FIG. 1 by 125. The thermal gradient may be achieved simply by exposing the outer surface of the thermoelectric material to the ambient atmosphere. Thermoelectric power generated can be stored or used by an appropriate load in accordance with techniques known to those skilled in the art.

It is expected that apparatus 100 described in the above will be operable to generate hydrogen at a rate of several liters per minute, suitable to deliver continuous power in a range between 100 W and 400 W. However, it is envisaged that, through appropriate use of hydrogen storage and delivery, significantly higher peak powers can be delivered by the apparatus. Moreover, krypton-85, having a half-life in excess of ten years, is able to sustain water dissociation over long periods of time, and the power generation apparatus will function over a period of multiples of the half-life. Additional power is generated by the above-described thermoelectric means.

Whilst one specific embodiment of the invention has been described in the above, it is to be noted that variations and modifications are possible departing from the scope of the present invention which is defined in the accompanying claims. For example, it may be possible to add other radioactive species to the plasma in order to alter the interactions that take place within plasma. For example, radioisotopes decaying by positron emission could be added. Positrons present in the plasma would annihilate with electrons, resulting in the emission of highly energetic gamma rays. Such highly exothermic interactions increase the temperature in the plasma container, can be beneficial, for example for reducing recombination rates, and the additional thermal energy generated can in addition be parasitically harvested by the above-described thermoelectric power generation. Higher temperature operation may be particularly beneficial when lead telluride is used as a thermoelectric material, since lead telluride is a more effective thermoelectric power generator at temperatures slightly higher the range described above. An example of such an additional species is iodine-124, which can be added in the form of hydrogen iodide. Iodine-124 decays by positron emission with a half of four days.

Furthermore, whilst in the above-described embodiment, oxygen evolved from the dissociation of water molecules is simply dumped, it will be possible to use the oxygen, for example in the fuel cell in the event that the power conversion apparatus is to be used in an environment where oxygen supply is limited. Moreover, it may also be possible to use a suitable getter material in order to remove oxygen from the gas mixture flowing through the plasma container, in contrast to the ion transport membrane described in the above.

Other forms of power generation may also be included in the apparatus in order to enhance the overall efficiency of the apparatus, such as wide bandgap photovoltaic cells, even though the efficiency of such devices is not expected to be high at the operating temperature of the apparatus. It may be desirable to bias the electron population towards the surface of the plasma container in order that the high temperature surface of the thermoelectric material be most effectively heated. Such an effect could be achieved, for example, by magnetic means.

It will also be noted that the pressure within the plasma container can be varied from the 10 atmospheres described in relation to the above-described embodiment. It is thought that an appropriate balance between the various energy generation mechanisms can be achieved with a pressure in the range between 5 atmospheres and 30 atmospheres, although more preferably the pressure is maintained in the range between 10 atmospheres and 20 atmospheres.

Finally, it is noted that it is to be clearly understood that any feature described above in relation to any one embodiment may be used alone, or in combination with other features described, and may also be used in combination with one or more features of any other of the embodiments, or combination of any other of the embodiments.

The invention claimed is:

1. An apparatus for electricity generation, comprising:
   a plasma container containing a plasma, the plasma including a radioactive gas, the plasma sustained by radioactive decay of the radioactive gas;
   an inlet of the plasma container through which, in use of the apparatus, water will be introduced to the plasma container;
   an outlet of the plasma container through which, in use of the apparatus, material containing hydrogen and oxygen resulting from dissociation of water molecules by interactions between radicals in the plasma and the water will be exhausted from the plasma container;
   a separator for separating hydrogen from material exhausted from the plasma container, the separator being coupled to the outlet, the separator also being coupled to the inlet, and the outlet being coupled to the inlet via the separator so that any exhaust gases that remain after the hydrogen is separated can be recirculated into the inlet of the plasma container; and
   a generator operable to generate electricity using the hydrogen as a fuel.

2. Apparatus as claimed in claim 1, wherein the radioactive gas comprises:
   a radioisotope susceptible to decay by beta decay.

3. Apparatus as claimed in claim 1, wherein the radioactive gas comprises:
   krypton-85.

4. Apparatus as claimed in claim 1, wherein the radioactive gas comprises:
   a radioisotope susceptible to decay by positron emission.

5. Apparatus as claimed in claim 1, wherein the generator comprises:
   a fuel cell.

6. Apparatus as claimed in claim 1, wherein the pressure in the plasma container is approximately 10 atmospheres.

7. Apparatus as claimed in claim 1, comprising:
   a mixture management system operable to control pressure in the plasma container, and to control relative amounts of water vapour and radioactive gas in the plasma container to maintain a sufficient ratio of radioactive gas to water vapour by varying a rate of introduction of water vapour, to provide a suitable ionisation rate, wherein the mixture management system is coupled between the separator and the inlet so that the mixture management system recirculates the remaining exhaust gases into the plasma container.

8. Apparatus as claimed in claim 1, comprising:
   a hydrogen storage device to store hydrogen when expelled from the plasma container and operable to deliver hydrogen to the generator at a rate dependent on electric power demand.

9. Apparatus as claimed in claim 1, wherein the separator comprises:
   a selective transport membrane.

10. Apparatus as claimed in claim 9, wherein the selective transport membrane comprises:
    a hydrogen selective membrane.

11. Apparatus as claimed in claim 1, comprising:
a thermoelectric power generator which includes a thermoelectric material having a first portion in thermal contact with a surface of the plasma container and a second portion in thermal contact with a heat sink.

12. Apparatus as claimed in claim 11 wherein the thermoelectric material comprises:
lead telluride.

13. Apparatus for the generation of electrical power comprising:
means to dissociate water molecules to form hydrogen and oxygen;
means to separate and store hydrogen; and
means to generate electricity using the stored hydrogen as a fuel, the means to dissociate water including a plasma including a radioactive gas in a plasma container having an inlet and an outlet, the plasma sustained by radioactive decay of the radioactive gas, the hydrogen and oxygen resulting from the means to dissociate the water by interactions between radicals in the plasma and the water,
wherein the means to separate the hydrogen includes a separator coupled to the inlet, and the outlet is coupled to the inlet via the separator so that any exhaust gases that remain after the hydrogen is separated can be recirculated into the inlet of the plasma container.

14. A method of generating electric power, comprising:
passing water through a plasma including a radioactive gas, the plasma sustained by radioactive decay of the radioactive gas and contained within a plasma container, the plasma being arranged such that water molecules are dissociated into hydrogen and oxygen by interactions between radicals in the plasma and the water;
separating the hydrogen;
supplying the hydrogen from the plasma container to a fuel cell; and
operating the fuel cell to generate electric power; and
recirculating any exhaust gases that remain after the hydrogen is separated into an inlet of the plasma container.

15. Apparatus as claimed in claim 2, wherein the generator comprises:
a fuel cell.

16. Apparatus as claimed in claim 15, comprising:
a mixture management system operable to control pressure in the plasma container, and to control relative amounts of water vapour and radioactive gas in the plasma container, wherein the mixture management system is coupled between the separator and the inlet so that the mixture management system recirculates the remaining exhaust gases into the plasma container.

17. Apparatus as claimed in claim 16, comprising:
a hydrogen storage device to store hydrogen when expelled from the plasma container and operable to deliver hydrogen to the generator at a rate dependent on electric power demand.

18. Apparatus as claimed in claim 17, wherein the separator comprises:
a selective transport membrane.

19. Apparatus as claimed in claim 18, wherein the selective transport membrane comprises:
a hydrogen selective membrane.

20. Apparatus as claimed in claim 18, comprising:
a thermoelectric power generator which includes a thermoelectric material having a first portion in thermal contact with a surface of the plasma container and a second portion in thermal contact with a heat sink.

* * * * *